United States Patent
Wang et al.

(10) Patent No.: US 11,612,859 B2
(45) Date of Patent: Mar. 28, 2023

(54) LOW-TEMPERATURE NO$_x$ STORAGE CATALYST USED FOR AUTOMOBILE EXHAUST PURIFICATION AND PREPARATION METHOD THEREOF

(71) Applicant: SINOCAT ENVIRONMENTAL TECHNOLOGY CO., LTD., Chengdu (CN)

(72) Inventors: Yun Wang, Chengdu (CN); Haidi Xu, Chengdu (CN); Yi Dan, Chengdu (CN); Yongxiang Cheng, Chengdu (CN); Zhifeng Zhang, Chengdu (CN); Yinhua Dong, Chengdu (CN); Dequan Chen, Chengdu (CN); Yaoqiang Chen, Chengdu (CN); Yun Li, Chengdu (CN); Qizhang Chen, Chengdu (CN)

(73) Assignee: Sinocat Enviromental Technology Co., Ltd., Chengdu (CN)

( * ) Notice: Subject to any disclaimer, the term of this patent is extended or adjusted under 35 U.S.C. 154(b) by 1 day.

(21) Appl. No.: 17/619,073

(22) PCT Filed: Jun. 12, 2020

(86) PCT No.: PCT/CN2020/095905
§ 371 (c)(1),
(2) Date: Dec. 14, 2021

(87) PCT Pub. No.: WO2020/249104
PCT Pub. Date: Dec. 17, 2020

(65) Prior Publication Data
US 2022/0241726 A1 Aug. 4, 2022

(30) Foreign Application Priority Data
Jun. 14, 2019 (CN) .......................... 201910515807.1

(51) Int. Cl.
*F01N 3/08* (2006.01)
*B01J 29/85* (2006.01)
*B01J 29/74* (2006.01)
*B01D 53/94* (2006.01)

(52) U.S. Cl.
CPC .......... *B01D 53/9422* (2013.01); *B01J 29/74* (2013.01); *B01J 29/7415* (2013.01); *B01J 29/85* (2013.01); *F01N 3/0842* (2013.01); B01D 2255/1021 (2013.01); B01D 2255/1023 (2013.01); B01D 2255/91 (2013.01); B01D 2257/404 (2013.01); B01D 2258/01 (2013.01)

(58) Field of Classification Search
CPC ........ B01D 53/9422; B01D 2255/1021; B01D 2255/1023; B01D 2255/91; B01D 2257/404; B01D 2258/01; B01J 29/74; B01J 29/7415; B01J 29/85; B01J 23/42; B01J 23/44; B01J 20/165; B01J 20/32; B01J 37/0234; F01N 3/0842; F01N 2240/18; F01N 2250/12; F01N 2250/14; F01N 2570/14
See application file for complete search history.

(56) References Cited

U.S. PATENT DOCUMENTS

| | | | |
|---|---|---|---|
| 2002/0013228 A1* | 1/2002 | Matsumoto | F01N 3/0835 502/332 |
| 2012/0308439 A1 | 12/2012 | Chen et al. | |
| 2016/0250594 A1 | 9/2016 | Casci et al. | |
| 2017/0096922 A1 | 4/2017 | Bergeal et al. | |
| 2017/0128922 A1 | 5/2017 | Chen et al. | |
| 2018/0065086 A1 | 3/2018 | Bidal et al. | |

FOREIGN PATENT DOCUMENTS

| | | | |
|---|---|---|---|
| CN | 103619469 A | 3/2014 | |
| CN | 107250497 A | 10/2017 | |
| CN | 108138623 A | 6/2018 | |
| CN | 108927147 A | 12/2018 | |
| CN | 110 215 932 A * | 9/2019 | .............. B01J 29/74 |
| JP | 2013146693 A | 8/2013 | |

OTHER PUBLICATIONS

International Search Report for International Application No. PCT/CN2020/095905 dated Sep. 16, 2020; International Filing Date Jun. 12, 2020; 3 pages; ISA/CN, Beijing, China.

* cited by examiner

*Primary Examiner* — Timothy C Vanoy
(74) *Attorney, Agent, or Firm* — Andrew D. Fortney; Central California IP Group, P.C.

(57) ABSTRACT

A low-temperature NO$_x$ storage catalyst for automobile exhaust purification and a preparation method thereof. Loading a noble metal salt solution on molecular sieve by equal volume impregnation method, wherein the noble metal salt solution comprises palladium nitrate and platinum nitrate, and the molecular sieve comprises SSZ, SAPO and BETA, then drying at 60-120° C. for 2-6 h, roasting at 500-550° C. in air for 2-5 h, and further roasting at 750-850° C. in air for 2-5 h, and then mixing with aluminum sol, ball milling and pulping, and then coating the slurry on a carrier, wherein the loading on the coating is 100-250 g/L and the noble metal content is 10-150 g/ft$^3$, drying at 60-120° C. for 2-6 h, then roasting at 500-550° C. in air for 2-5 h, and further continuing roasting at 750-850° C. in air for 2-5 h, to obtain the catalyst. Loading the noble metals Pt and Pd into a pore channel of a molecular sieve improves NO$_x$ storage capacity of a catalyst at low temperatures, and selecting a different type of molecular sieve as an NO$_x$ storage unit and increasing a roasting temperature of a molecular sieve material on which Pt and Pd are loaded significantly increases NO$_x$ storage capacity.

5 Claims, 1 Drawing Sheet

LOW-TEMPERATURE $NO_x$ STORAGE CATALYST USED FOR AUTOMOBILE EXHAUST PURIFICATION AND PREPARATION METHOD THEREOF

TECHNICAL FIELD OF INVENTION

The invention belongs to the technical field of catalyst preparation, in particular to the technical field of automobile exhaust catalyst preparation, and particularly relates to a low-temperature $NO_x$ storage catalyst for automobile exhaust purification and a preparation method thereof.

BACKGROUND

The heavy-duty engine emission test cycle has been upgraded from the ETC cycle of China V vehicle emission standards to the WHTC cycle of China VI vehicle emission standards. In the cold cycle of diesel engine WHTC, it takes at least 400 s for SCR inlet temperature to reach above 200° C. At this time, urea injection is started, and $NO_x$ is reduced to $N_2$ through SCR. For some engines with poor emissions in cold start stage, the emissions in cold start stage may be close to the regulatory limit. In the cold start cycle of natural gas engine WHTC, it takes at least 250 s for the inlet temperature of TWC to reach above 300° C., and then the conversion of TWC to $NO_x$ begins. In addition, in the National VIb stage of China, the whole vehicle PEMS test was added for heavy vehicles, and the average exhaust temperature was lower than the exhaust temperature of engine WHTC cycle. Therefore, the $NO_x$ emission in the cold start stage will become one of the difficulties in the China VI vehicle emission standards, especially the China VIb vehicle emission standards.

One of the ways to solve the $NO_x$ emission of automobile in cold start stage is to add a $NO_x$ adsorption catalyst on the exhaust pipe of automobile. Traditionally, $NO_x$ adsorption catalysts are mainly molecular sieves. The adsorption and storage capacity of $NO_x$ by different types of molecular sieves are quite different, and the molecular sieves suitable for adsorption and storage of $NO_x$ under the condition of automobile exhaust include SAPO, BETA, SSZ and the like. Adding a certain amount of noble metals or transition metals to molecular sieve materials can improve the adsorption capacity of $NO_x$, among which the addition of noble metals Pd or Pt can improve the adsorption capacity of $NO_x$ most significantly.

SUMMARY OF THE INVENTION

The object of the present invention is to provide a low-temperature $NO_x$ storage catalyst which is mainly used to purify $NO_x$ in the cold start stage of heavy diesel vehicles or heavy natural gas vehicles, and a preparation method thereof. In the cold start stage, the catalyst of the invention stores $NO_x$ emitted by automobiles, and after the temperature rises, $NO_x$ is released, wherein $NO_x$ released by diesel vehicles reacts on the downstream SCR. The $NO_x$ released by the natural gas vehicle reacts on the downstream TWC to purify the $NO_x$ emitted at low temperature. The catalyst coating mainly uses molecular sieve as carrier material and noble metal as active component. Active components include but are not limited to noble metal elements such as Pt and Pd. Molecular sieves include but are not limited to BETA, SAPO and SSZ molecular sieves.

In this invention, the storage capacity of Pt and Pd in different proportions on SAPO-34 molecular sieve for $NO_x$ was studied, and the results showed that the catalyst with high Pt and low Pd had higher storage capacity for $NO_x$. Furthermore, the high Pt and low Pd loading on SSZ-13 and BETA molecular sieves were compared. The results showed that SSZ-13 had higher $NO_x$ adsorption capacity when used as adsorbent. Furthermore, SSZ-13 with high Pt and low Pd loading was selected to optimize the preparation process. The roasting temperature of catalyst powder and catalyst was increased from 500° C. to 800° C., and the storage capacity of the prepared catalyst for $NO_x$ was further improved.

The preparation method of the catalyst adopted by the invention is as follows: first, the active component is loaded on the molecular sieve material, then dried, roasted and solidified, and finally, the slurry is coated on the cordierite substrate. The method is simple in process and easy to operate.

The invention is realized by the following technical solutions:

(1) Loading a noble metal salt solution on molecular sieve by equal volume impregnation method, wherein the noble metal salt solution comprises but not limited to palladium nitrate and platinum nitrate, and the molecular sieve comprises but not limited to SSZ, SAPO and BETA, and the content of noble metals in element accounts for more than 0% and no more than 3% by mass of the coating, then drying at 60-120° C. for 2-6 h, roasting at 500-550° C. in air for 2-5 h, and further roasting at 750-850° C. in air for 2-5 h to obtain M1;

(2) Mixing M1 and aluminum sol, ball milling and pulping to obtain a noble metal slurry N1;

(3) Coating the slurry N1 on a carrier, wherein the loading on the coating is 100-250 g/L and the noble metal content is 10-150 g/ft$^3$, drying at 60-120° C. for 2-6 h, then roasting at 500-550° C. in air for 2-5 h, and further continuing roasting at 750-850° C. in air for 2-5 h, to obtain the catalyst.

In the above step, the noble metal precursors are preferably platinum nitrate and palladium nitrate or other soluble salts.

In that above step, the ratio of noble metal platinum and palladium in the monolithic catalyst is preferably 1:9-9:1.

The molecular sieve is one of or a mixture of more of SSZ, SAPO or BETA.

The method has the advantages that noble metals Pt and Pd are loaded into the pore channels of the molecular sieve, such that the storage capacity of the catalyst for $NO_x$ at low temperature is improved.

According to the characteristics of exhaust temperature and original exhaust of different types of engines, different types of molecular sieves are selected as $NO_x$ storage units.

According to the invention, by increasing the roasting temperature of the molecular sieve powder and the catalyst supported by Pt and Pd, the storage capacity of $NO_x$ is obviously increased.

The noble metal-based molecular sieve $NO_x$ storage catalyst prepared by the invention has larger $NO_x$ storage capacity and can reduce the catalyst volume matched with the engine.

The invention adopts the traditional equal volume impregnation process and pulping process, which is simple and feasible.

In the figure, the ordinate is the relative adsorption amount of NO, in %; and on the abscissa, C0 is the comparative catalyst, and C1-C7 are the catalysts of Examples 1 to 7.

Figure 2:
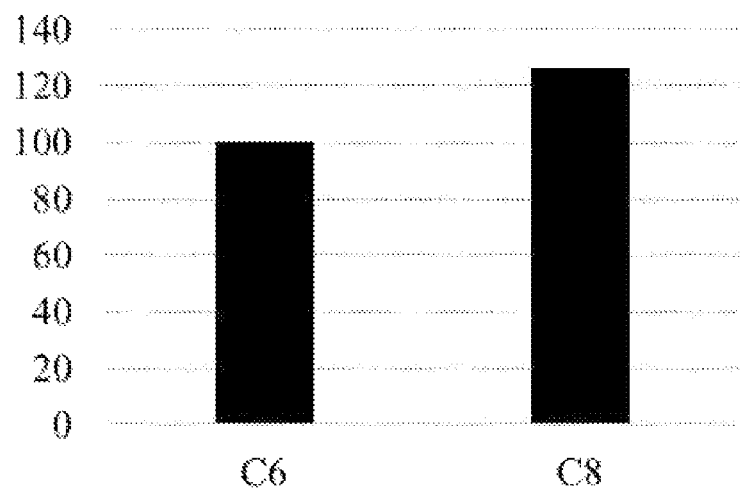

FIG. 2 shows the relative storage capacity of NO of the catalysts prepared in Examples 6 and 8 of the present invention.

In the figure, the ordinate is the relative storage amount of NO, in %; and on the abscissa, C6 is the catalyst of Example 6 and C8 is the catalyst of Example 8.

DETAILED DESCRIPTION OF EMBODIMENTS

In the followings, the present invention will be further explained with reference to the specific examples, which are further explanations of the principle of the present invention and does not limit the present invention in any way. The same or similar technologies as the present invention do not exceed the scope of the present invention.

Comparative Example 1

SAPO-34 was mixed with aluminum sol, ball-milled for 10 min, and the binder accounted for 3%, and the slurry N0 with a solid content of 45% was obtained.

N0 was coated on cordierite substrate, and the carrier size was Φ25.4*101.6/400 cpsi-4 mil. The sample was dried at 80° C. for 6 h, roasted at 500° C. for 2 h, with a coating amount of 150 g/L.

The catalyst prepared above was designated as C0.

Example 1

Palladium nitrate solution was loaded on SAPO-34 molecular sieve by equal volume impregnation method, dried at 80° C. for 6 h, and roasted at 500° C. for 2 h, which was designated as M1.

M1 is mixed with aluminum sol, ball-milled for 10 min, and the binder accounted for 3%, thus obtaining slurry N1 with a solid content of 45%.

N1 was coated on cordierite substrate, and the carrier size was Φ25.4*101.6/400 cpsi-4 mil. The sample was dried at 80° C. for 6 h, roasted at 500° C. for 2 h, with a coating amount of 150 g/L, a noble metal content of 100 g/ft$^3$.

The catalyst prepared above was designated as C1.

Example 2

Platinum nitrate solution was loaded on SAPO-34 molecular sieve by equal volume impregnation method, dried at 80° C. for 6 h, and roasted at 500° C. for 2 h, which was designated as M2.

M2 was mixed with aluminum sol, ball-milled for 10 min, and the binder accounted for 3%, thus obtaining slurry N2 with a solid content of 45%.

N2 was coated on cordierite substrate, and the carrier size was Φ25.4*101.6/400 cpsi-4 mil. The sample was dried at 80° C. for 6 h, roasted at 500° C. for 2 h, with a coating amount of 150 g/L, a noble metal content of 100 g/ft$^3$.

The catalyst prepared above was designated as C2.

Example 3

Platinum nitrate solution was loaded on SAPO-34 molecular sieve by equal volume impregnation method, dried at 80° C. for 6 h, and roasted at 500° C. for 2 h, which was designated as M3-1.

Palladium nitrate solution was loaded on SAPO-34 molecular sieve by equal volume impregnation method, dried at 80° C. for 6 h, and roasted at 500° C. for 2 h, which was designated as M3-2.

M3-1 and M3-2 were mixed at a ratio of 1:3, and aluminum sol was added. After ball milling for 10 min, the binder accounted for 3%, and the slurry N3 with a solid content of 45% was obtained.

N3 was coated on cordierite substrate, and the carrier size was Φ25.4*101.6/400 cpsi-4 mil. The sample was dried at 80° C. for 6 h, roasted at 500° C. for 2 h, with a coating amount of 150 g/L, a noble metal content of 100 g/ft$^3$.

The catalyst prepared above was designated as C3.

Example 4

Platinum nitrate solution was loaded on SAPO-34 molecular sieve by equal volume impregnation method, dried at 80° C. for 6 h and roasted at 500° C. for 2 h, which was designated as M4-1.

Palladium nitrate solution was loaded on SAPO-34 molecular sieve by equal volume impregnation method, dried at 80° C. for 6 h, and roasted at 500° C. for 2 h, which was designated as M4-2.

M4-1 and M4-2 were mixed in a ratio of 3:1, and aluminum sol was added. After ball milling for 10 min, the binder accounted for 3%, and the slurry N4 with a solid content of 45% was obtained.

N4 was coated on cordierite substrate, and the carrier size was Φ25.4*101.6/400 cpsi-4 mil. The sample was dried at 80° C. for 6 h, roasted at 500° C. for 2 h, with a coating amount of 150 g/L, a noble metal content of 100 g/ft$^3$.

The catalyst prepared above was designated as C4.

Example 5

Platinum nitrate solution was loaded on SAPO-34 molecular sieve by equal volume impregnation method, dried at 80° C. for 6 h and roasted at 500° C. for 2 h, which was designated as M5-1.

Palladium nitrate solution was loaded on SAPO-34 molecular sieve by equal volume impregnation method, dried at 80° C. for 6 h, and roasted at 500° C. for 2 h, which was designated as M5-2.

M5-1 and M5-2 were mixed at a ratio of 1:1, and aluminum sol was added. After ball milling for 10 min, the binder accounted for 3%, and the slurry N5 with a solid content of 45% was obtained.

N5 was coated on cordierite substrate, and the carrier size was Φ25.4*101.6/400 cpsi-4 mil. The sample was dried at 80° C. for 6 h, roasted at 500° C. for 2 h, with a coating amount of 150 g/L, a noble metal content of 100 g/ft$^3$.

The catalyst prepared above was designated as C5.

Example 6

Platinum nitrate solution was loaded on SSZ-13 molecular sieve by equal volume impregnation method, dried at 80° C. for 6 h and roasted at 500° C. for 2 h, which was designated as M6-1.

Palladium nitrate solution was loaded on SSZ-13 molecular sieve by equal volume impregnation method, dried at 80° C. for 6 h and roasted at 500° C. for 2 h, which was designated as M6-2.

M6-1 and M6-2 were mixed in a ratio of 3:1, and aluminum sol was added. After ball milling for 10 min, the binder accounted for 3%, and the slurry N6 with a solid content of 45% was obtained.

N6 was coated on cordierite substrate, and the carrier size was Φ25.4*101.6/400 cpsi-4 mil. The sample was dried at 80° C. for 6 h, roasted at 500° C. for 2 h, with a coating amount of 150 g/L, a noble metal content of 100 g/ft$^3$.

The catalyst prepared above was designated as C6.

Example 7

Platinum nitrate solution was loaded on BETA molecular sieve by equal volume impregnation method, dried at 80° C. for 6 h, and roasted at 500° C. for 2 h, which was designated M7-1.

Palladium nitrate solution was loaded on BETA molecular sieve by equal volume impregnation method, dried at 80° C. for 6 h, and roasted at 500° C. for 2 h, which was designated as M7-2.

M7-1 and M7-2 were mixed in a ratio of 3:1, and aluminum sol was added. After ball milling for 10 min, the binder accounted for 3%, and the slurry N7 with a solid content of 45% was obtained.

N7 was coated on cordierite substrate, and the carrier size was Φ25.4*101.6/400 cpsi-4 mil. The sample was dried at 80° C. for 6 h, roasted at 500° C. for 2 h, with a coating amount of 150 g/L, a noble metal content of 100 g/ft$^3$.

The catalyst prepared above was designated as C7.

Example 8

Platinum nitrate solution was loaded on SSZ-13 molecular sieve by equal volume impregnation method, dried at 80° C. for 6 h, roasted at 500° C. for 2 h and roasted at 800° C. for 2 h, which was designated as M8-1.

Palladium nitrate solution was loaded on SSZ-13 molecular sieve by equal volume impregnation method, dried at 80° C. for 6 h, roasted at 500° C. for 2 h and roasted at 800° C. for 2 h, which was designated as M8-2.

M6-1 and M6-2 were mixed in a ratio of 3:1, and aluminum sol was added. After ball milling for 10 min, the binder accounted for 3%, and the slurry N8 with a solid content of 45% was obtained.

N8 was coated on cordierite substrate, and the carrier size was Φ25.4*101.6/400 cpsi-4 mil. The sample was dried at 80° C. for 6 h, roasted at 500° C. for 2 h and roasting at 800° C. for 2 h, with a coating amount of 150 g/L, a noble metal content of 100 g/ft$^3$.

The catalyst prepared above was designated as C8.

The catalysts prepared in the above examples were tested for activity evaluation under the following test conditions.

The temperature of the catalyst was programmatically elevated to 450° C. in 5% $O_2$ atmosphere, kept at constant temperature for 1 hour, cooled to 25° C., and the experimental atmosphere was switched to 5% NO, kept at constant temperature for 30 min, then switched to $N_2$, and the temperature was increased to 450° C. at 10° C./min. In the test, NO was used to replace $NO_x$ in the exhaust emission. The relative adsorption amount of NO in each Example and Comparative Example is shown in FIG. 1.

Figure 1:
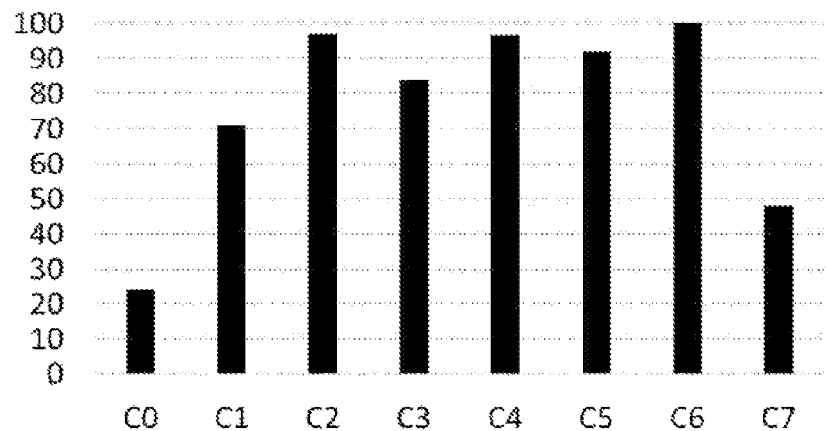
FIG. 1 shows the relative storage capacity of NO of the catalyst prepared in various examples of the present invention.

As can be seen from FIG. 1:

1) Compared with Comparative Example C0, Examples C1 and C2 have the same molecular sieve. Comparative Example C0 does not contain noble metals, and C1 and C2 are loaded with noble metals Pd and Pt respectively. The relative adsorption capacity of NO increased greatly after Loading a noble metals in molecular sieves.

2) In Examples C1-C5, the molecular sieves were the same, but the noble metals and proportions were different. Compared with C1, C2 had a higher adsorption capacity of NO, such that Pt, as an active component, had a higher adsorption capacity of NO than Pd. C3-C5 were catalysts with different ratios of Pt and Pd, and the tendencies were the same as those of C1 and C2. C2 and C4 with higher Pt content had relatively higher adsorption capacity.

3) In Example C6, compared with C4, noble metals and proportions were the same, but molecular sieves were different. Compared with C4, C6 molecular sieve changed from SAPO-34 to SSZ-13, and the relative adsorption capacity of NO increased.

4) In Example C7, compared with C4, noble metals and proportions were the same, but molecular sieves were different. Compared with C4, C7 molecular sieve changed from SAPO-34 to BETA, the relative adsorption capacity of NO decreased.

5) In Example C8, compared with C6, the noble metals and proportions were the same, and the molecular sieve was the same. The main difference was the roasting temperature of molecular sieve powder supported by noble metals. Compared with C6, C8 powders, when the roasting temperature was increased from 500° C. to 800° C., the relative NO adsorption capacity of the prepared catalyst was further significantly improved.

The above experiments show that, (a) the storage capacity of NO is greatly increased after noble metals are loaded in molecular sieves; and (b) when loaded on molecular sieve, compared with Pd, the storage capacity of NO is relatively larger for noble metal Pt; and (c) under the premise of loading the same noble metals, the storage capacity of NO by BETA, SAPO-34 and SSZ-13 molecular sieves increases in turn; and (d) increasing the roasting temperature of the noble metal-loaded molecular sieve results in further increasing the NO storage capacity.

What is claimed:

1. A preparation method of low-temperature $NO_x$ storage catalyst for automobile exhaust purification, characterized by comprising the following steps:
    (1) Loading a noble metal salt solution on molecular sieve by equal volume impregnation method, wherein the noble metal salt solution comprises but not limited to palladium nitrate and platinum nitrate, and the molecular sieve comprises but not limited to SSZ, SAPO and BETA, and the content of noble metals in element accounts for more than 0% and no more than 3% by mass of the coating, then drying at 60-120° C. for 2-6 h, roasting at 500-550° C. in air for 2-5 h, and further roasting at 750-850° C. in air for 2-5 h to obtain M1;
    (2) Mixing M1 and aluminum sol, ball milling and pulping to obtain a noble metal slurry N1;
    (3) Coating the slurry N1 on a carrier, wherein the loading on the coating is 100-250 g/L and the noble metal content is 10-150 g/ft$^3$, drying at 60-120° C. for 2-6 h, then roasting at 500-550° C. in air for 2-5 h, and further continuing roasting at 750-850° C. in air for 2-5 h, to obtain the catalyst.

2. The preparation method of low-temperature $NO_x$ storage catalyst for automobile exhaust purification according to claim 1, characterized in that, in step (1), the noble metal salt solution is a soluble salt solution of platinum and palladium.

3. The preparation method of low-temperature $NO_x$ storage catalyst for automobile exhaust purification according to claim 1, characterized in that, the mass ratio of platinum and palladium in the catalyst is 1:9-9:1.

4. The preparation method of low-temperature $NO_x$ storage catalyst for automobile exhaust purification according to claim 1, characterized in that, the molecular sieve is one of or a mixture of more of SSZ, SAPO or BETA.

5. A low-temperature $NO_x$ storage catalyst for automobile exhaust purification, characterized in that, the catalyst is a catalyst prepared by the preparation method of any one of claims 1 to 4.

* * * * *